United States Patent [19]
Bay et al.

[11] Patent Number: 5,564,647
[45] Date of Patent: Oct. 15, 1996

[54] HIGH PERFORMANCE TAPE REEL

[75] Inventors: Randy S. Bay, Wahpeton, N. Dak.; Daniel C. Egan, Oakdale, Minn.; Leif O. Erickson, River Falls; John W. Louks, Hudson, both of Wis.; Donald L. Pochardt, Hastings, Minn.

[73] Assignee: Imation Corp., St. Paul, Minn.

[21] Appl. No.: 266,437

[22] Filed: Jun. 27, 1994

[51] Int. Cl.⁶ .................................................... B65H 75/14
[52] U.S. Cl. ...................................... 242/608.8; 242/610.6
[58] Field of Search ............................. 242/608.8, 610.6, 242/338.1, 338.3, 345, 345.2

[56] References Cited

U.S. PATENT DOCUMENTS

| | | | |
|---|---|---|---|
| 3,706,426 | 12/1972 | Prahl | 242/345.2 |
| 4,083,509 | 4/1978 | Vasudeva et al. | 242/608.8 |
| 4,088,278 | 5/1978 | Adair | 242/608.8 |
| 4,184,650 | 1/1980 | Nelson et al. | 242/608.8 |
| 4,296,890 | 10/1981 | Posso | 242/608.8 |
| 4,540,133 | 9/1985 | Alsobrook | 242/608.8 |
| 5,297,754 | 3/1994 | Albrecht et al. | |
| 5,366,173 | 11/1994 | Lammers et al. | 242/338.1 |
| 5,400,981 | 3/1995 | Rambosek et al. | 242/348 |

*Primary Examiner*—John M. Jillions
*Attorney, Agent, or Firm*—Charles L. Dennis, II

[57] ABSTRACT

A high performance tape reel with an outwardly facing cylindrical tape winding surface parallel to a drive pin bore on a reel hub. The hub has a pair of hub reference surfaces adjacent to the winding surface for aligning tape flanges. Flanges are attached to the hub at a location remote from the winding surface and magnetic tape. A drive cap with a reel pin bearing surface is attached to the hub so that the reel pin bearing surface substantially covers one entrance to the drive pin bore.

25 Claims, 5 Drawing Sheets

HIGH PERFORMANCE TAPE REEL

Field of the Invention

The present invention is directed to a high performance tape reel for a magnetic tape cartridge which is easy to assemble, and more particularly, to a mass produced tape reel in which the tape winding surface, side support flanges, and drive pin bore on the hub are maintained in precise alignment.

Background of the Invention

The allowable tape speed and tape storage capacity (i.e., data density) on a magnetic tape increase with the accuracy at which the tape is coupled to the read/write heads of a tape drive. It has been found that the alignment between the tape reel and a tape guide structure greatly influences the accuracy at which the magnetic tape is presented to the read/write heads. For example, the tracking error between the data tracks and the read/write heads must not exceed 0.9 microns.

In particular, accurate alignment of the winding surface on the reel to the tape guide, alignment of the side support flanges relative to the winding surface, and the parallelism and eccentricity of the drive pin bore relative to the tape winding surface on the hub all impact on the accuracy with which the magnetic tape is presented to the read/write heads. Additionally, the height of the tape reel pin is critical since it determines the location of the tape winding surface relative to the tape guide.

On the other hand, magnetic cartridges are generally low-cost, mass-produced items. An injection molded tape reel, while easy to produce, is difficult to mold in mass quantities to the tight tolerances necessary for a high performance tape reel. Therefore, a high performance tape reel which is easy to assemble and mass produce is needed to enhance the performance of magnetic tape drives.

Summary of the Invention

The present invention is directed to an easy to produce, high-performance tape reel in which the upper and lower tape support flanges, a tape winding surface, and a drive pin bore in the reel hub are precisely aligned.

The tape reel hub includes a center hub portion with a drive pin bore and an outer hub portion with an outwardly facing cylindrical tape winding surface parallel to the drive pin bore axis. The outer hub portion has a pair of hub reference surfaces adjacent to the winding surface. A hub web connects the center hub portion to the outer hub portion. Upper and lower flanges attached to the hub have tape side supports extending away from the winding surface and flange reference surfaces contacting the hub reference surfaces. The flanges have lateral portions which are bonded to the hub web at a location that is remote from the tape winding surface. Since the flanges are bonded to the hub at a location remote from the winding surface and the tape side supports, the winding surface is not damaged during the bonding process. Additionally, the side supports are not warped during bonding. Finally, flash or debris generated during the bonding operation is not introduced to the winding surface, and, ultimately, the media.

In the preferred embodiment, the hub reference surfaces are adjacent to the winding surface, as well as perpendicular thereto. The drive pin bore preferably extends through the center hub portion in order to achieve greater accuracy in the molding process.

The upper and lower flanges preferably are symmetrical. The lateral portions of the flanges preferably have a draft transition which creates a line contact between the lateral portions and the inner surface of the outer hub portion to substantially minimize bonding at those locations. Channels or flash wells may be provided on the flanges proximate the flange reference surfaces and/or near the bonding area.

The flanges also preferably include a stiffening member proximate the location where the flanges are bonded to the hub web. A flash well may be located between the bonding location and the stiffening member to prevent flash or debris from contaminating the tape.

The present invention also is directed to a tape reel for magnetic tape in which a drive cap is attached to the center hub portion of the tape reel. The drive cap has a plurality of drive teeth on an outer surface defining a plane perpendicular to the tape winding surface. The inner surface of the drive cap has a reel pin bearing surface which covers one entrance of the drive pin bore and supports the tape reel on a reel pin. The center hub portion and drive cap may be constructed of the same or different material.

The drive cap preferably includes at least one snap leg extending into snap leg openings proximate the center hub portion. A brake plate may be interposed between the drive cap and the center hub portion to prevent rotation of the tape reel when the cartridge is not engaged with a tape drive.

The present invention is also directed to a tape cartridge containing magnetic tape having a cartridge frame with at least one tape reel pin. The tape reels discussed above are engaged rotatably to the tape reel pin. A tape guide attached to the cartridge frame is provided for guiding the magnetic tape through a read/write zone. The read/write zone is where the magnetic tape is coupled with the read/write heads. Magnetic tape is wound around at least one tape reel so that it passes over the tape guide and through the read/write zone.

The preferred method of assembling the high performance tape reel comprises ultrasonically welding, although a variety of bonding techniques may be used.

DETAILED DESCRIPTION OF THE PREFERRED EMBODIMENTS

Figure 1:
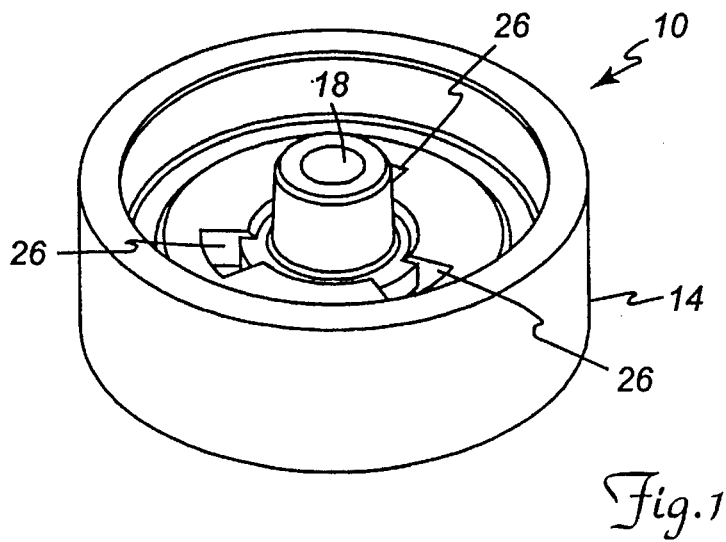
FIG. 1 is a perspective view of the preferred tape reel hub.
Figure 2:
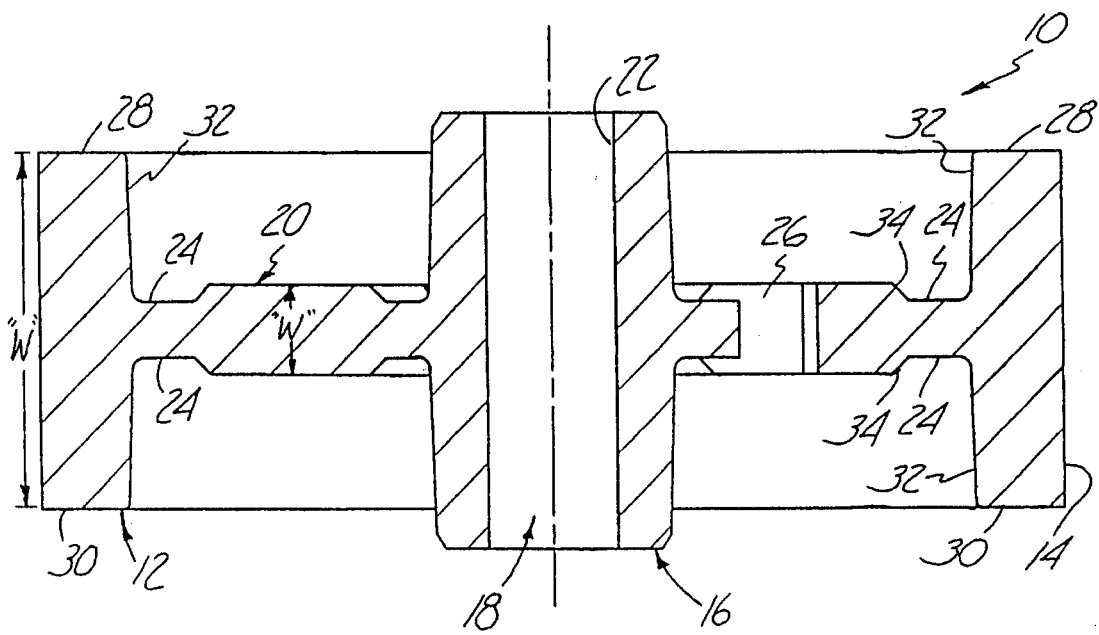
FIG. 2 is a cross sectional view of the tape reel hub illustrated in FIG. 1.

FIGS. 1 and 2 illustrate the preferred tape reel hub 10 of the present invention. The tape reel hub 10 has a cylindrically shaped outer hub portion 12 with a tape winding surface 14. A center hub portion 16 having a drive pin bore 18 is connected to the outer hub portion 12 by a hub web 20. The drive pin bore 18 has a guide surface 22 which preferably is concentric to the winding surface 14 within 0.001 inches (0.025 mm). The total circular runout of the winding surface 14 preferably is less than 0.001 inches (0.025 mm). The diameter of the drive pin bore 18 is preferably maintained within +/−0.0002 inches (0.005 mm).

In order to maintain these tolerances during the injection molding process, the core pin which forms the drive pin bore 18 is preferably secured at both ends to the mold (not shown). It has been found that a cantilever mold pin flexes when the plastic is injected into the mold, resulting in significant inaccuracy in the concentric alignment of the drive pin bore 18 with the winding surface 14.

Both sides of the hub web 20 include bonding areas 24 adjacent to an inner surface 32 of the outer hub portion 12 which extend around the perimeter of the inner surface 32. The web 20 has bevels 34 adjacent to the bonding areas 24 forming a flash well 107 for collecting debris at the bonding areas 24 (see FIG. 7). The web 20 also includes several snap leg openings 26 which are used for attaching a drive cap (see FIGS. 5 and 7), as will be discussed in detail below. In the preferred embodiment, the hub web 20 includes three snap leg openings 26 evenly spaced around the perimeter of the center hub portion 16. It will be understood that the present invention is not limited by the specific number of snap leg openings 26 or bonding areas 24.

The outer hub portion 12 includes hub reference surfaces 28 and 30, which preferably are located around the top and bottom edges of the cylindrical outer hub portion 12 adjacent to the winding surface 14. It will be understood by those skilled in the art that the hub reference surfaces 28, 30 do not necessarily need to extend around the full perimeter of the outer hub portion 12. Additionally, the bonding areas 24 may be placed strategically along the perimeter of the hub web 20.

The winding surface 14 has a width "W", while the hub web has a maximum thickness of "w". Consequently, the bonding areas 24 are offset and remote from the hub reference surfaces 28, 30 and are behind the winding surface 14. The tape reel hub 10 preferably is constructed of polycarbonate.

Figure 3:
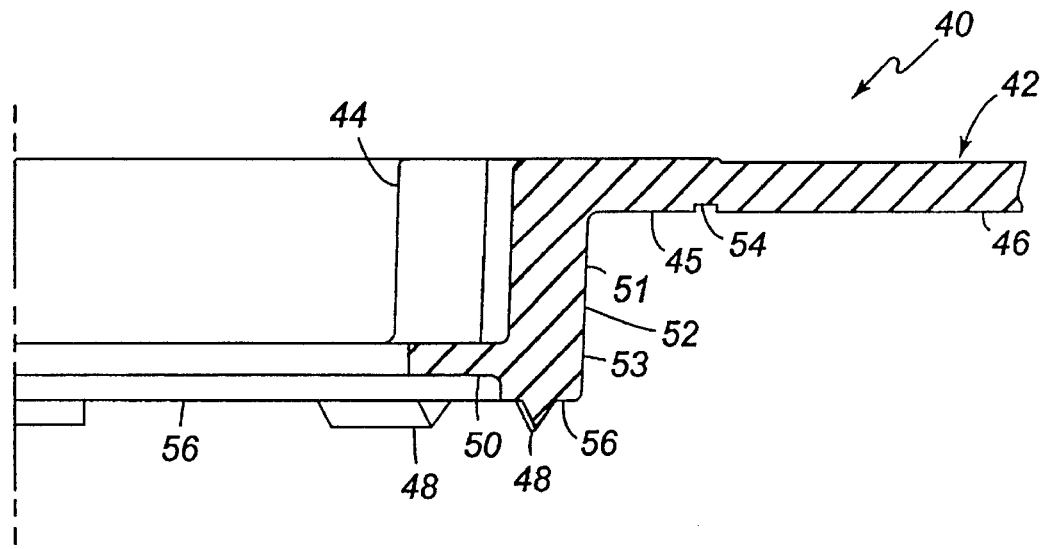
FIG. 3 is a cross sectional view of a portion of the preferred flange member.
Figure 4:
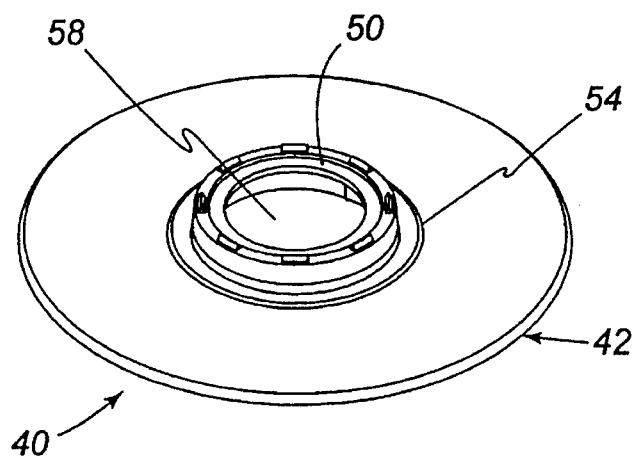
FIG. 4 is a perspective view of the flange member illustrated in Fig.3.

FIGS. 3 and 4 illustrate the preferred flange member 40 for use with the tape reel hub 10. The flange member 40 includes tape side members 42 with flange reference surfaces 45 for engagement with the hub reference surfaces 28, 30. A lateral portion 44 extends generally inward from flange reference surfaces 45 toward the hub web 20 (see FIG. 7). A plurality of energy concentrators 48 are provided on a surface 56 adjacent to the lateral portion 44. The energy concentrators 48 represent the bonding points at which the flange members 40 are attached to the bonding areas 24 on the reel web 20. The preferred flange member 40 is constructed of a clear polycarbonate. The energy concentrators 48 comprise raised portions of polycarbonate material which preferably are welded ultrasonically to the bonding areas 24 on the hub web 20. It will be understood that the flange member 40 may be joined to the tape reel hub 10 by a variety of techniques, with or without the energy concentrators 48, and that the scope of the invention is not limited to the ultrasonic welding process.

A stiffening rib 50 preferably extends around an opening 58 to add rigidity-to the flange member 40 and to minimize warpage or distortion of the flange member 40 during the bonding process. When a flange 40 is bonded to the web 20, the stiffening rib 50 is drawn close to the hub web 20, and in some circumstances actually may contact the web 20. The gap between the rib 50 and the web 20 is small enough to retain flash or debris created during bonding in a flash well 107 (see FIG. 7).

A draft transition 52 between surfaces 51 and 53 on the lateral portion 44 preferably is sloped inward toward the opening 58. Surface 51 preferably is angled inward by 1.0 degree and surface 53 is angled inward by 5.0 degrees so that the draft transition 52 is the high point between the surfaces 51, 53. The angles of corresponding surface 32 differ, so that only a line contact is made at the draft transition 52. When the flange member 40 is bonded to the tape reel hub 10, the draft transition 52 operates as a line contact between the lateral portion 44 and the inner surface 32 of the outer hub portion 12. The draft transition 52 minimizes or eliminates bonding between the lateral portion 44 and the surfaces 51 and 53. Additionally, the generation of flash at the intersection of the surface 51 with the hub reference surfaces 28, 30 is minimized or eliminated.

Flash channel or well 54 preferably is provided around the perimeter of the flange reference surface 45 to minimize the formation of flash, to retain any attached flash or debris created during bonding so that it does not contaminate the tape, and to prevent bonding between the hub reference surfaces 28, 30 and the flange reference surface 45.

Wobble and vertical runout of the flanges 40 are critical to aligning the tape with the read/write heads. The tape support surface 46 has a flatness no more than 0.0006 inches (0.015 mm). Tape support surfaces 46 preferably are tapered outward from the lateral portion 44 relative to the flange reference surface 45.

The reference surface 45 operates as a mechanical stop to limit the weld depth of the flanges 40. The combined length of the surfaces 51 and 53 preferably are less than or equal to the length of the inner surfaces 32 so that the surface 56 does not prevent the reference surfaces 28, 30, and 45 from fully engaging. Consequently, flange wobble is a primarily function of the flange molding process and is largely independent of the bonding process.

Figure 5:
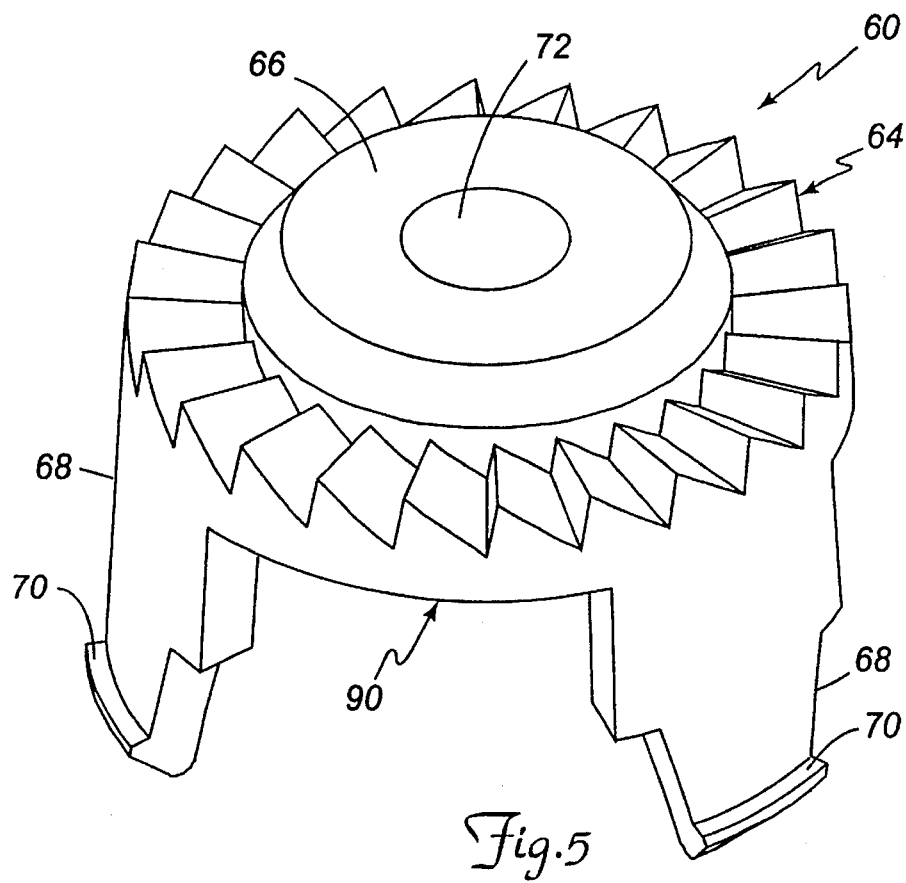
FIG. 5 is a perspective view of the preferred drive cap.
Figure 6:
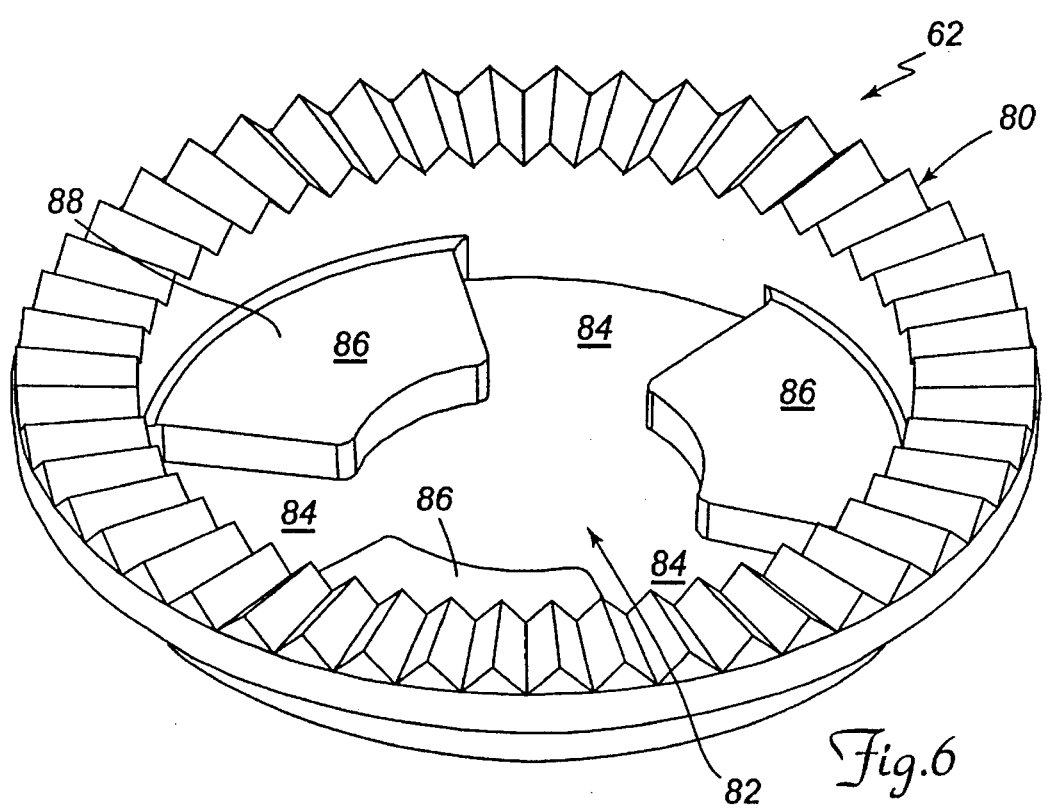
FIG. 6.is a perspective view of the preferred brake plate for use with the drive cap illustrated in FIG. 5.

FIGS. 5 and 6 illustrate the preferred drive cap 60 and brake plate 62 for use with the tape reel hub 10. The drive cap 60 has an outer surface with a plurality of drive teeth 64 extending around the perimeter of the upper side of a cover portion 66. It will be understood that any suitable drive surface may be substituted for the drive teeth 64 on the drive cap 60.

A plurality of snap legs 68 extend downward from the cover portion 66 for engagement with the snap leg openings 26 on the hub web 20. In the preferred embodiment, the drive cap 60 has three snap legs 68 evenly spaced around the perimeter thereof. Hook portions 70 are located on the distal end of the snap legs 68 to engage with the edge of the snap leg openings 26 on the hub web 20.

The drive cap 60 preferably is constructed of an amorphous material with a low shrinkage rate which permits accurate molding. The preferred amorphous material is polycarbonate. However, semi-crystalline materials such as acetal or nylon may be used because they are good bearing materials. ABS plastic and various polycarbonates may also be suitable for constructing the drive cap 60.

Figure 7:
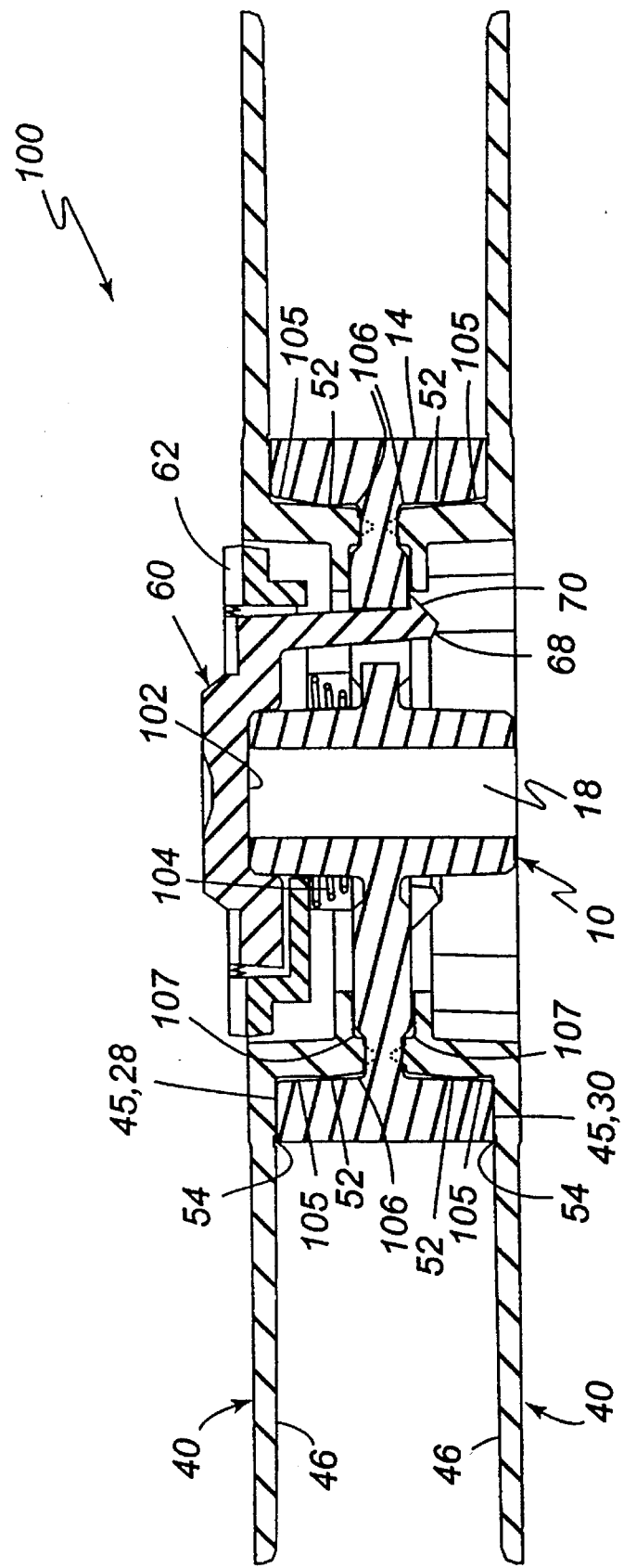
FIG. 7 is a cross sectional view of the preferred tape reel.

The resiliency of the drive cap material causes the snap leg 68 to press outward away from the center point 72, thereby engaging the hook portion 70 with the hub web 20. FIG. 7 illustrates the hook portion 70 on one snap leg 68 engaged with the hub web 20.

In an alternate embodiment, the snap leg openings 26 may be formed with a wide portion and a narrow portion that is smaller than the hook portions 70. The drive cap 60 may be locked into engagement with the reel hub 10 by inserting the snap legs 68 into the wide portion and rotating the cap 60 relative to the hub 10 so that the legs 68 are wedged in the narrow portions. Alternatively, the drive cap 60 may be welded to the tape reel hub 10.

Figure 8:
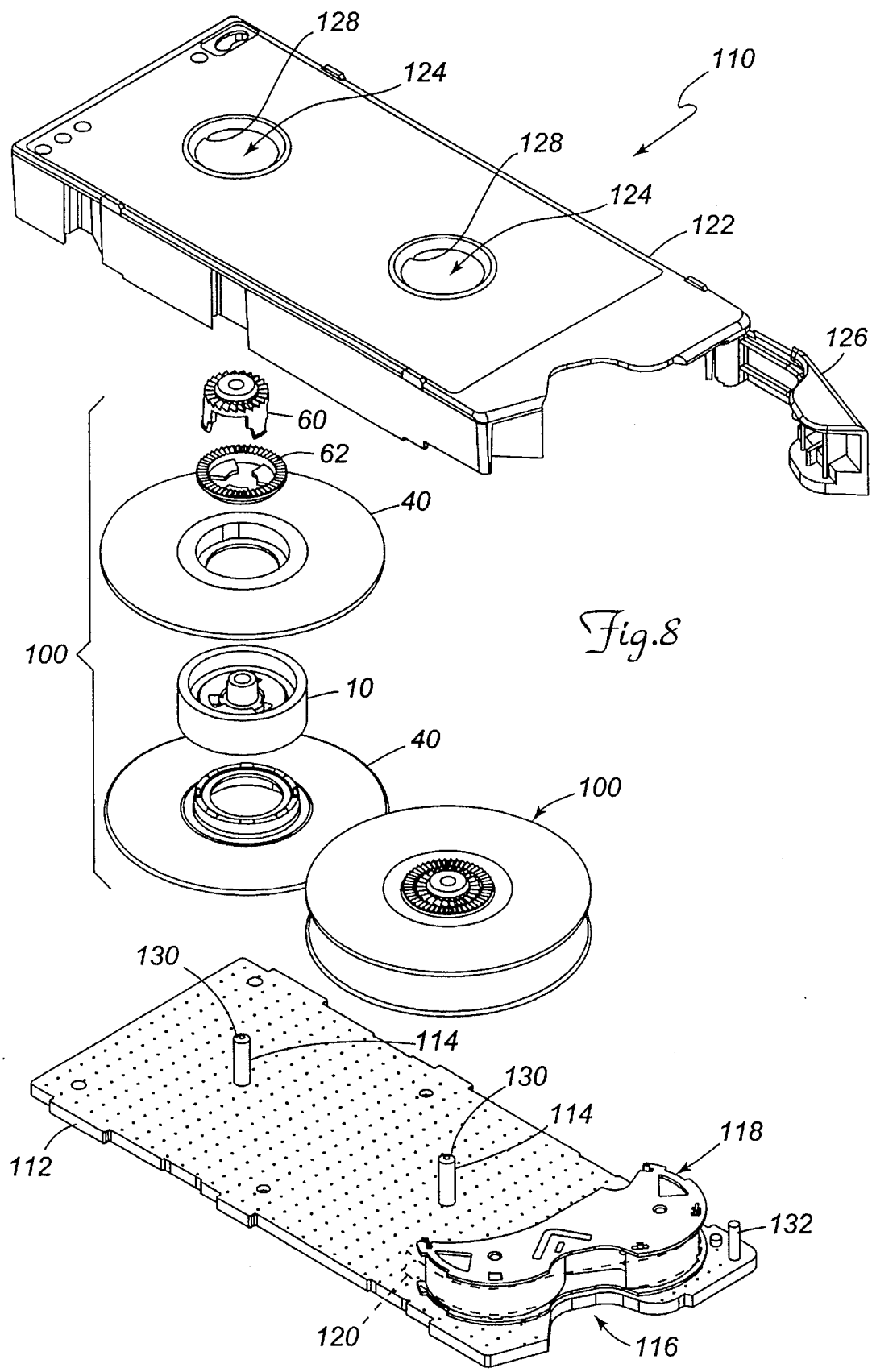
FIG. 8 is an exploded view of an exemplary tape cartridge utilizing the preferred tape reel.

The brake plate 62 illustrated in FIG. 6 has a plurality of brake teeth 80 extending around the perimeter thereof. The brake plate 62 preferably is shaped cylindrically with a center opening 82 in a series of spaces 84 adjacent to three stop plates 86. As is illustrated in FIGS. 7 and 8, the snap legs 68 are inserted into the spaces 84 in the brake plate 62. The top surfaces 88 of the stop plates 86 are intended to engage with the brake plate stop surface 90 on the underside of the drive cap 60. The brake plate 62 preferably is constructed of polycarbonate.

FIG. 7 is a sectional view of the preferred tape reel 100. When the drive cap 60 is engaged with the tape reel hub 10, a drive cap bearing surface 102 on the lower side of the cap 60 covers one entrance of the drive pin bore 18. The drive cap bearing surface 102 is intended to engage with a reel pin bearing surface 130 on a tape reel pin 114 (see FIG. 8) in a tape cartridge. The combined drive cap 60 and tape reel hub 10 structure allows the drive pin bore 18 to extend completely through the center hub portion 16 so that the core pin which forms the bore 18 is secured at both ends of the mold (not shown) during the injection molding process. The two-piece tape reel 10 and drive cap 60 assembly has the additional advantage of allowing the respective pieces to be constructed from different materials. For example, the hub 10 may be constructed from a material which allows tight tolerances during molding, while the cap 60 may be constructed from a material which provides the least amount of friction with metal tape reel pins and/or greater durability of the drive teeth 64.

The brake plate 62 is interposed between the drive cap 60 and the tape reel hub 10. The brake plate 62 is retained to the tape reel hub 10 by the drive cap 60, rather than by cover 122 (see FIG. 8). A spring 104 supported by the hub web 20 is provided to bias the brake plate 62 against the brake plate stop surface 90 of the drive cap 60. It will be understood that the spring 104 may be located in a variety of locations and that the disclosed location does not limit the scope of the invention.

The upper and lower flange members 40 are positioned so that the flange reference surfaces 45 contact the hub reference surfaces 28, 30, respectively. The engagement of these reference surfaces aligns the tape support surfaces 46 of the flanges 40 with the tape reel hub 10, and in particular, with the winding surface 14.

As discussed above, the lateral portions 44 of the flanges 40 are adjacent to the inner surface 32 of the outer hub portion 12. The energy concentrators 48 contact the bonding areas 24 on the hub web 20 at a location removed from the tape winding surface 14 and tape support surfaces 46.

The line contact between the draft transition 52 and the surface 32 creates gaps 105, 106. The gaps 105, 106 operate as flash wells, minimize bonding between the inner surface 32 and the surfaces 51, 53, and minimize the generation of flash at the intersection of surface 51 with the hub reference surfaces 28, 30.

The flash channel 54 is designed to minimize and retain any attached flash or debris generated during the welding or molding processes which may migrate towards the tape winding surface 14, and ultimately the magnetic tape. In the preferred embodiment, the flash channel 54 extends completely around the perimeter of the flange member 40 at the winding surface edges. Flash wells 107 also retain debris located near the bonding areas 24 to keep it from contaminating the tape.

FIG. 8 is an exploded view of an exemplary tape cartridge 110 utilizing the preferred tape reel 100. The tape cartridge 110 includes a base plate 112 with a pair of tape reel pins 114 for engagement with the drive pin bore 18 on the tape reel hub 10. The tape reel pins 114 usually are constructed of metal. The base plate 112 has a read/write zone 116 proximate a tape guide 118 where the magnetic tape 120 is coupled with read/write heads on a tape drive (not shown). It will be understood that the present tape reel invention may also be used with a single-reel tape cartridge.

A cover 122 with a pair of drive cap openings 124 is attached to the base plate 112 to protect the magnetic tape 120 from environmental contamination. A ridge 128 is provided adjacent to the drive cap openings 124 for engagement with the teeth 80 on the brake plate 62. When the tape cartridge 110 is not in a tape drive, the spring 104 biases the brake plate 62 into engagement with the ridge 128, thereby preventing the tape reels 100 from rotating. When the cartridge 110 is engaged with a tape drive (not shown), the brake plate 62 is pressed toward the base plate 112 by the drive, disengaging the ridge 128 from the brake plate 62 and allowing the tape reels 100 to turn freely. A door 126 may be attached to the base plate 112 by hinge pin 132 to protect the magnetic tape 120 when the tape cartridge 110 is not in a tape drive.

It will be understood that these exemplary embodiments in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of specific elements, dimensions, materials, or configurations contained therein. All alternative modifications and variations of the present invention which fall within the spirit and broad scope of the appended claims are covered.

We claim:

1. A tape reel for magnetic tape, comprising:

a center hub portion with an elongated opening;

an outer hub portion having an outwardly facing cylindrical tape winding surface substantially parallel to the opening, an inner surface, and first and second hub reference surfaces disposed on opposite sides of the winding surface, the winding surface having a tape winding surface width;

a hub web having bonding areas connecting the center hub portion to the inner surface of the outer hub portion, the hub web having a thickness less than the tape winding surface width; and upper and lower flanges each having tape side members extending radially outward from the winding surface, flange reference surfaces contacting the first and second hub reference surfaces, respectively, lateral portions extending to the hub web, and surfaces adjacent to the lateral portions bonded to the bonding areas on the hub web.

2. The tape reel of claim 1 wherein the first and second hub reference surfaces are perpendicular to the tape winding surface.

3. The tape reel of claim 1 wherein the upper and lower flanges are identical.

4. The tape reel of claim 1 wherein the elongated opening is cylindrical.

5. The tape reel of claim 1 wherein the elongated opening extends completely through the center hub portion.

6. The tape reel of claim 5 further including a drive cap having an upper drive surface and a lower drive cap bearing surface, the drive cap being engaged with the center hub portion so that the lower drive cap bearing surface substantially obstructs one entrance of the opening.

7. The tape reel of claim 6 wherein the drive surface includes a plurality of drive teeth.

8. The tape reel of claim 6 wherein the drive cap and the center hub portion are constructed from different materials.

9. The tape reel of claim 1 wherein the lateral portions are located proximate the inner surface of the outer hub portion.

10. The tape reel of claim 1 wherein a gap generally separates the inner surface of the outer hub portion from the lateral portions of the upper and lower flanges.

11. The tape reel of claim 1 wherein upper and lower flanges include a channel proximate the flange reference surfaces.

12. The tape reel of claim 1 wherein upper and lower flanges include a stiffening member proximate the surfaces.

13. The tape reel of claim 1 wherein the bonding areas are located adjacent to the inner surface of the outer hub portion.

14. The tape reel of claim 1 wherein flash wells are formed in the hub web adjacent to the bonding areas.

15. The tape reel of claim 1 wherein the outer hub, the center hub portion, and the hub web are constructed from polycarbonate.

16. The tape reel of claim 1 wherein the surfaces are bonded to the bonding areas by ultrasonic welding.

17. A tape reel for magnetic tape, comprising: a hub comprising:

a center hub portion with a cylindrical opening;

a generally cylindrically shaped outer hub portion having an outwardly facing tape winding surface parallel to the opening, an inner surface opposite the tape winding surface, and first and second hub reference surfaces on first and second ends of the cylindrical outer hub portion, the winding surface having a tape winding surface width;

a hub web extending between the center hub portion and a middle region of the inner surface of the outer hub portion, the hub web having a thickness less than the tape winding surface width and bonding areas proximate the inner surface; and upper and lower circular flanges each having flange reference surfaces contacting the first and second hub reference surfaces, respectively, tape side members extending radially outward from the tape winding surface, and lateral portions extending generally along the inner surface of the outer hub portion, the lateral portions being bonded to the hub web at the bonding areas.

18. A tape cartridge containing magnetic tape, comprising:

a cartridge frame having at least one tape reel pin;

at least one tape reel rotatably connected to the tape reel pin comprising;

a center hub portion with an elongated opening engaged with the at least one tape reel pin;

an outer hub portion having an outwardly facing cylindrical tape winding surface parallel to the opening, an inner surface, and first and second hub reference surfaces disposed on opposite sides of the winding surface, the winding surface having a tape winding surface width;

a hub web having bonding areas connecting the center hub portion to the inner surface of the outer hub portion, the hub web having a thickness less than the winding surface width;

upper and lower flanges each having tape side members extending radially outward from the winding surface, flange reference surfaces contacting the first and second hub reference surfaces, respectively, lateral portions extending to the hub web, and surfaces adjacent to the lateral portions bonded to the bonding areas on the hub web;

a tape guide attached to the cartridge frame for guiding the tape to and from the at least one tape reel longitudinally through a read/write zone;

drive means for rotating at least one of the tape reels; and magnetic tape wound on the at least one tape reel.

19. A tape reel for magnetic tape, comprising:

an outer hub portion having an outwardly facing cylindrical tape winding surface;

a center hub portion having an elongated opening extending completely through the center hub portion substantially parallel to the tape winding surface, the opening having a top entrance and a bottom entrance;

a drive cap attached to the center hub portion having a lower surface with a reel pin bearing surface substantially covering the top entrance of the opening and an upper drive surface; and upper and lower tape support flanges attached to the outer hub portion each having tape side members extending away from the tape winding surface.

20. The tape reel of claim 19 wherein the reel pin bearing surface is constructed of a polycarbonate.

21. The tape reel of claim 19 wherein the center hub portion includes a least one snap leg openings and the drive cap includes at least one snap leg extending into the snap leg opening to anchor the drive cap to the center hub portion.

22. The tape reel of claim 19 wherein a brake plate is retained to the center hub portion by the drive cap.

23. The tape reel of claim 22 wherein the brake plate is biased against the drive cap.

24. The tape reel of claim 19 wherein the upper drive surface includes drive teeth defining a surface perpendicular to the tape winding surface.

25. A tape cartridge containing magnetic tape, comprising:

a cartridge frame having at least one tape reel pin, the at least one reel pin having a bearing surface;

at least one tape reel comprising;

an outer hub portion having an outwardly facing cylindrical tape winding surface;

a center hub portion having an elongated opening parallel to the tape winding surface, the opening having a top entrance and a bottom entrance engaged with the tape reel pin;

a drive cap attached to the center hub portion having a lower surface with a reel pin bearing surface engaged with the bearing surface of the at least one reel pin and substantially covering the top entrance of the opening, and an upper surface with a plurality of drive teeth;

upper and lower tape flanges attached to the outer hub portion each having tape side members extending away from the tape winding surface;

a tape guide attached to the cartridge frame for guiding the tape to and from the at least one tape reel longitudinally through a read/write zone; and magnetic tape wound on the at least one tape reel extending through the read/write zone.

* * * * *